United States Patent Office 3,518,129
Patented June 30, 1970

3,518,129
NOVEL PHOSPHATING SOLUTIONS CONTAINING LEAD AND FLUORIDE IONS
John W. Forsberg, Mentor-on-the-Lake, Ohio, assignor to The Lubrizol Corporation, Wickliffe, Ohio, a corporation of Ohio
No Drawing. Filed Jan. 11, 1968, Ser. No. 697,020
Int. Cl. C23f 7/08
U.S. Cl. 148—6.15                        10 Claims

ABSTRACT OF THE DISCLOSURE

Aqueous phosphating solutions containing phosphate, nitrate, lead and fluoride ions apparently form a crystalline, fluoride-containing apatite-like coating on metal surfaces. This coating results in improved adhesion of siccative organic coatings as compared with other lead phosphate solutions, while preserving the properties of weldability, improved drawing properties and improved adhesion of electrophoretic paints imparted by these other solutions.

This application is a continuation-in-part of copending application Ser. No. 425,949, filed Jan. 15, 1965, now Pat. No. 3,364,081 issued Jan. 16, 1968.

This invention relates to metal treatment solutions, and more particularly to an aqueous phosphating solution having a total acidity of about 5–850 points in which the active ingredients consist essentially of about 0.1–40.0% (by weight) phosphate ion, about 0.2–55.0% nitrate ion, about 0.2–30.0% lead ion and about 0.005–0.30% fluoride ion.

It is well known in the metal finishing art that metal surfaces may be provided with an inorganic phosphate coating by contacting them with an aqueous phosphating solution. The phosphate coating protects the metal surface to a limited extent against corrosion and provides other advantageous properties including promotion of adhesion of siccative organic coatings such as paint, lacquer, varnish, synthetic resins and the like.

Such inorganic phosphate coatings are generally formed on a metal surface by means of aqueous solutions which contain the phosphate ion and, preferably, auxiliary ions such as sodium, manganese, zinc, cadmium, copper, antimony, ammonium, halide, nitrate and the like. Frequently, an oxidizing agent such as sodium chlorate, potassium perborate, sodium nitrate, sodium chlorite, potassium perchlorate or hydrogen peroxide is included in the phosphating solution to depolarize the metal surface being treated and thereby increase the rate at which the phosphate coating is formed. Other auxiliary agents such as anti-sludging agents, coloring agents, and metal cleaning agents may also be incorporated in the phosphating solution.

In copending application Ser. No. 425,949, filed Jan. 15, 1965, there is described a new and improved aqueous phosphating solution in which the active ingredients consist essentially of phosphate ion, nitrate ion and lead ion. Optional auxiliary agents in this solution include ammonium ion and halide ions. Treatment of a metal surface, especially a ferrous metal surface, with these lead phosphate solutions imparts to the surface a unique collection of improved properties. In particular, it has been found that lead phosphate solutions may be used for coating at temperatures lower than most other phosphating solutions, and that metal surfaces treated therewith are weldable, have improved drawing properties and are superior with respect to adhesion of electrophoretically applied paints.

Considering these properties, the value of lead phosphate solutions for the treatment of metal is apparent. However, it has been found that metal surfaces treated with these solutions leave something to be desired with respect to adhesion of certain paints applied by ordinary (non-electrophoretic) methods. While paint adhesion can usually be improved by pre-treatment of the metal surfaces—for example, by vapor-abrasive cleaning, treatment with alkaline potassium permanganate, or pickling with a ntric-phosphoric acid solution—it will be apparent that the phosphating operation would be vastly more satisfactory if the adhesion of all types of paints could be made optimum without the introduction of additional steps in the metal treatment process.

A principal objects of the present invention, therefore, is to provide improved phosphating solutions for the treatment of metal surfaces.

A further object is to provide superior phosphating solutions containing lead.

A further objects is to provide phosphating solutions which impart a wide variety of advantageous properties, including excellent adhesion of all types of siccative organic coatings, to metal surfaces.

Still another object is to provide an improved process for metal treatment and improved metal articles.

Other objects will in part be obvious and will in part appear hereinafter.

X-ray studies of the phosphate coating formed on a metal surface by treatment with a lead phosphate solution, as described in the above-mentioned copending application, have shown that the crystalline structure of this coating is similar to apatite and contains lead, phosphate and hydroxide or halide ions. If the phosphating solution contains no halide ion, the monovalent anion in the coating is hydroxide; if halide ion is present in the solution, it will also be present in the coating in varying amounts. Ordinarily, there is either no halide ion present in the solution or only chloride ion is present. The present invention is based on the discovery that incorporation of fluoride ion in the phosphating solution causes the formation of an apatite-like coating in which the monovalent anion is entirely or largely fluoride ion, and that said coating provides excellent paint adhesion to the metal.

As indicated hereinabove, the active ingredients in the phosphating solutions of this invention consist essentially of phosphate, nitrate, lead and fluoride ions in the indicated proportions, and the solutions have a total acidity of about 5–850 points. (The term "points total acidity" as employed in the phosphating art and in this specification represents the number of milliliters of 0.1 N sodium hydroxide solution required to neutralize a 10-ml. sample of a phosphating solution in the presence of phenolphthalein as an indicator.) The preferred solutions have a total acidity of about 50–400 points and contain about 0.5–35.0% phosphate ion, about 2.0–33.0% nitrate ion, about 0.5–25.0% lead ion and about 0.01–0.20%, desirably about 0.01–0.10%, fluoride ion.

The presence of iron, usually in the form of ferric ion, in the phosphating solutions of this invention is frequently advantageous. In general, a ferric ion concentration of about 0.01–0.20% is desirable in a fresh solution. As the solution is replenished during working, the iron concentration may increase to 2% or greater.

The phosphating solutions of this invention may be prepared by dissolution of suitable acids and salts in water in the desired proportions. In general, the acids and salts used and the additional ions contained therein are not critical. With regard to the source of fluoride ion, the preferred salts are potassium fluoride and sodium bifluoride. Ammonium bifluoride is also suitable but is not as highly preferred. Other fluorides may also be used in many instances.

The ingredients of the phosphating solution are generally furnished in the form of aqueous concentrates, which are diluted with water to form a solution of the desired acidity. According to the present invention, the phosphating solution is preferably made up by first forming a solution of nitric acid, phosphoric acid, ferric nitrate and sodium bifluoride, and subsequently adding lead nitrate. Generally, the lead nitrate concentrate contains a small amount of potassium nitrate which aids in solubilizing the lead. Because of the limited solubility of lead salts in aqueous solutions at high pH, the lead should be incorporated in the solution only when the pH is below about 2.

Table I gives the compositions of several aqueous phosphating solutions of this invention, which were prepared by the procedure described above. Except for "Points Total Acid," the figures represent weight percentages of the various ions. Solutions A–H are typical low-concentration phosphating solutions for ordinary use, while Solution J is a high-concentration solution for use where rapid application of the phosphate coating is desired.

A second coated panel is evaluated by the Conical Mandrel Test. In this test, one end of the panel is securely clamped while the other is inserted in a slot in a conical mandrel; the mandrel is then rotated through 180° at uniform velocity to bend the panel approximately 135° in about 15 seconds. The bent surface of the panel is examined immediately for cracking, after which the mandrel is returned to its original position and the panel removed. The percentage elongation of the finish is determined according to a standard curve from the distance of the end of the crack farthest from the small end of the mandrel.

A third panel is subjected to the ASTM Salt Spray Test. In this test, a scratch is made through the paint coating with a sharp instrument so as to expose the underlying metal. The scratched panel is then placed in a chamber at 95±2° F., wherein it is contacted with an

TABLE I

| Ingredient | Solution | | | | | | | | |
|---|---|---|---|---|---|---|---|---|---|
| | A | B | C | D | E | F | G | H | J |
| $PO_4^{-3}$ | 0.95 | 0.97 | 0.97 | 0.97 | 1.254 | 0.96 | 0.98 | 0.98 | 1.98 |
| $NO_3^-$ | 1.98 | 2.00 | 2.00 | 2.32 | 4.075 | 1.94 | 1.98 | 1.98 | 11.0 |
| $Pb^{+2}$ | 0.95 | 0.96 | 0.96 | 0.96 | 1.06 | 0.98 | 0.97 | 0.97 | 7.5 |
| $Fe^{+3}$ | 0.043 | 0.043 | 0.043 | 0.043 | 0.05 | 0.043 | 0.043 | 0.151 | 0.086 |
| $F^-$ | 0.05 | 0.017 | 0.034 | 0.033 | 0.16 | 0.068 | 0.017 | 0.017 | 0.1 |
| Points total acid | 40 | 42 | 40 | 44 | 50 | 39 | 42 | 43 | 115 |

The techniques for the treatment of metal surfaces with phosphating solutions are known in the art, and an extended description of them herein is not believed necessary. In general, the metal surface (which may be steel, aluminum, cadmium, zinc or the like but is preferably ferrous metal) is first cleaned by physical and/or chemical means, rinsed and subsequently treated with the phosphating solution, ordinarily by spraying or dipping. Dipping is the preferred method of application of the solutions of this invention. Within the preferred temperature range of about 50–150° F., a total contact time up to about 3 minutes is usually adequate to produce a satisfactory coating. After the phosphating treatment, the article is generally rinsed with water and/or a hot dilute aqueous solution of chromic acid or a metal chromate or dichromate. A suitable siccative organic coating composition, such as a paint, may then be applied.

The phosphate coating produced by treatment with the solutions of this invention appears, from X-ray analysis, to be chiefly a fluoride-containing apatite-like crystalline coating $[Pb_{10}F_2(PO_4)_6]$. Thus, it differs from the lead phosphate coatings produced by the solutions of application Ser. No. 425,949 which are apparently mixtures of $Pb_{10}(OH)_2(PO_4)_6$ and $Pb_{10}Cl_2(PO_4)_6$.

The effectiveness of the phosphating solutions of this invention for improving adhesion of siccative organic coatings is demonstrated by a series of tests in which steel panels are cleaned, rinsed with water, and dipped in the phosphating solutions at about 76° F. (for Solutions A–H) or 100° F. (for Solution J). The immersion time in the solution is 2 minutes for Solutions A–H and 5 seconds for Solution J. Following the phosphating treatment, the panel is rinsed with cold water and then with a dilute aqueous solution of calcium dichromate. After drying, it is spray-coated with a toluene solution of a melamine-alkyd type white baking enamel (film thickness 0.8–1.0 mil) and is then baked for 20 minutes at 320° F. to cure the paint film.

One of the panels treated as described above is subjected to the Reverse Impact Test, in which a weight with a convex striking surface is allowed to strike the panel with a measured force. Scotch tape is then applied to the convex surface of the impact area on the panel until all the paint which adheres to the tape has been removed. The results of the test are reported as the number of inch-pounds force which (1) do not cause fracturing of the test film and (2) do not cause loss of film adhesion on the convex side of the impact area.

atomized 5% aqueous salt solution for 120 hours. At the end of that time, the panel is removed, rinsed with water and dried, after which the width of the exposed metal at the scribed line is measured in 32nds of an inch. (This is given as "creep" in Table II.)

The results of these three tests are given in Table II. The control is a phosphate solution having a total acidity of 40 points and containing 0.95% lead, 0.95% phosphate, 2.1% nitrate and 0.047% iron. The immersion time for the control is 2 minutes and the immersion temperature is 78° F.

TABLE II

| Solution | Reverse impact, inch-lbs. (1) (2) | Conical mandrel, percent elongation | Salt Spray, "creep" |
|---|---|---|---|
| Control | <2 | (1) | (1) |
| A | 16, 20 | 99 | 1.5 |
| B | 8, 8 | 100 | 0.5 |
| C | 8, 8 | 100 | 1.0 |
| D | 10, 6 | 100 | 1.5 |
| E | 8, 10 | 100 | 2.0 |
| F | 10, 8 | 99 | 2.0 |
| G | 6, 6 | Slight loss | 1.0 |
| H | 4, 4 | Slight loss | 0.5 |
| J | 16, 8 | 100 | 0 |

[1] Complete loss of adhesion.

The above tests show that steel panels containing the phosphate coatings prepared by treatment with the fluorine-containing phosphating solutions of this invention have markedly improved adhesion of siccative organic coatings of this type.

What is claimed is:

1. An aqueous phosphating solution having a total acidity of about 5–850 points in which the active ingredients consist essentially of about 0.1–40.0% (by weight) phosphate ion, about 0.2–55.0% nitrate ion, about 0.2–30.0% lead ion and about 0.005–0.30% fluoride ion.

2. A phosphating solution according to claim 1 which additionally contains about 0.01–2.0% ferric ion.

3. A phosphating solution according to claim 1 which has a total acidity of about 50–400 points and contains about 0.5–35.0% phosphate ion, about 2.0–33.0% nitrate ion, about 0.5–25.0% lead ion and about 0.01–0.10% fluoride ion.

4. A phosphating solution according to claim 3 which additionally contains about 0.01–0.20% ferric ion.

5. A method for forming an adherent phosphate coating on a metal article which comprises contacting said article with the aqueous phosphating solution of claim 1 at a temperature of at least about 50° F.

6. A method for forming an adherent phosphate coating on a metal article which comprises contacting said article with the aqueous phosphating solution of claim 3 at a temperature of at least about 50° F.

7. A method for forming an adherent phosphate coating on a ferrous metal article which comprises contacting said article with the aqueous phosphating solution of claim 4 at a temperature of at least about 50° F.

8. A metal article which has been provided with an adherent phosphate coating by the method of claim 5.

9. A metal article which has been provided with an adherent phosphate coating by the method of claim 6.

10. A ferrous metal article which has been provided with an adherent phosphate coating by the method of claim 7.

References Cited
UNITED STATES PATENTS

| | | | |
|---|---|---|---|
| 2,487,137 | 11/1949 | Hoover et al. | 148—6.15 |
| 3,364,081 | 1/1968 | Forsberg | 148—6.15 |

RALPH S. KENDALL, Primary Examiner